US012093912B2

(12) United States Patent
Hamana

(10) Patent No.: US 12,093,912 B2
(45) Date of Patent: Sep. 17, 2024

(54) APPARATUS, METHOD FOR CONTROLLING THE SAME, AND STORAGE MEDIUM

(71) Applicant: CANON KABUSHIKI KAISHA, Tokyo (JP)

(72) Inventor: Akihiro Hamana, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/359,177

(22) Filed: Jun. 25, 2021

(65) Prior Publication Data
US 2022/0005009 A1  Jan. 6, 2022

(30) Foreign Application Priority Data

Jul. 1, 2020 (JP) .................................. 2020-114212

(51) Int. Cl.
*G06Q 20/20* (2012.01)
*G06Q 20/32* (2012.01)
*G06Q 20/40* (2012.01)
*G06Q 30/02* (2023.01)
*G06Q 30/0601* (2023.01)
*G06V 20/52* (2022.01)

(52) U.S. Cl.
CPC ......... *G06Q 20/201* (2013.01); *G06Q 20/204* (2013.01); *G06Q 20/4037* (2013.01); *G06Q 30/0281* (2013.01); *G06Q 30/0631* (2013.01); *G06V 20/52* (2022.01); *G06Q 20/322* (2013.01)

(58) Field of Classification Search
CPC ............... G06Q 20/201; G06Q 20/204; G06Q 20/4037; G06Q 30/0281; G06Q 30/0631; G06Q 20/322; G06Q 20/3676; G06V 20/52
See application file for complete search history.

(56) References Cited

U.S. PATENT DOCUMENTS

| | | | |
|---|---|---|---|
| 2018/0082348 A1* | 3/2018 | Banerjee | G06Q 30/0631 |
| 2018/0182025 A1* | 6/2018 | Smith | G06Q 30/0623 |
| 2019/0244161 A1* | 8/2019 | Abhishek | G06Q 10/087 |
| 2021/0124953 A1* | 4/2021 | Mirza | G06T 7/80 |
| 2021/0319420 A1* | 10/2021 | Yu | G06V 20/52 |

FOREIGN PATENT DOCUMENTS

JP   2019145054 A   8/2019

OTHER PUBLICATIONS

Tobias Otterbring, Eye-tracking customers' visual attention in the wild: Dynamic gaze behavior moderates the effect of store familiarity on navigational fluency, Nov. 14, 2015, Journal of Retailing and Consumer Services, vol. 28, pp. 165-170 (Year: 2015).*

* cited by examiner

*Primary Examiner* — Allen C Chein
*Assistant Examiner* — Aaron N Tutor
(74) *Attorney, Agent, or Firm* — Canon U.S.A., Inc., IP Division

(57) ABSTRACT

An apparatus acquires balance information indicating the balance of electronic money from a storage apparatus possessed by a user, and determines the total price of products picked up by the user using an image captured by an image capturing unit configured to capture an image in a store. In a case where the determined total price exceeds the balance, the apparatus outputs information notifying the user that the total price exceeds the balance.

19 Claims, 14 Drawing Sheets

FIG.5

| PERSON IDENTIFIER | PRODUCT | PRICE | QUANTITY | TOTAL |
|---|---|---|---|---|
| P001 | MEAT A | 800 | 1 | 1300 |
| | FISH B | 500 | 1 | |
| P002 | MEAT B | 500 | 1 | 1200 |
| | FISH A | 700 | 1 | |
| P003 | ... | ... | ... | ... |
| | ... | ... | ... | |

| PRODUCT CATEGORY (601) | PRODUCT (602) | PRICE (603) |
|---|---|---|
| MEAT | MEAT A | 800 |
| | MEAT B | 500 |
| | MEAT C | 1000 |
| FISH | FISH A | 700 |
| | FISH B | 500 |
| | FISH C | 900 |
| WATER | WATER A | 300 |
| | WATER B | 200 |
| | WATER C | 100 |
| BEER | BEER A | 300 |
| | BEER B | 200 |
| | BEER C | 100 |
| ... | ... | ... |
| | ... | ... |
| | ... | ... |

…

APPARATUS, METHOD FOR CONTROLLING THE SAME, AND STORAGE MEDIUM

BACKGROUND OF THE DISCLOSURE

Field of the Disclosure

The aspect of the embodiments relates to an apparatus, a method for controlling the apparatus, and a storage medium.

Description of the Related Art

Generally, in a conventional store such as a supermarket or a mass retailer, customers choose products from shelves, and sales clerks at checkout counters perform check-out operation. However, there has been an issue where the checkout area is crowded because the number of cash registers cannot be increased due to saving of labor and equipment costs. Japanese Patent Application Laid-Open No. 2019-145054 discusses a technique in which a plurality of cameras is installed in a store to capture images of customers to identify each customer, and to capture images of actions of the customers to identify which customer holds which product, and when each customer leaves the store, payment is automatically processed using a payment method that is pre-registered by the customer. Since the payment is cashless, the customer can reduce the time needed for shopping.

With the technique discussed in Japanese Patent Application Laid-Open No. 2019-145054, however, in a case where the customer is to pay in electronic money that has an upper limit, there may occur a case where the payment fails due to an insufficient balance of electronic money at the time of payment and the customer is to return a product to the original place in the store.

SUMMARY OF THE DISCLOSURE

According to an aspect of the embodiments, an apparatus includes an acquisition unit configured to acquire balance information indicating a balance of electronic money, from a storage apparatus possessed by a user, a determination unit configured to determine a total price of a product picked up by the user, using an image captured by an image capturing unit configured to capture an image in a store, and an output unit configured to output information in a case where the determined total price exceeds the balance indicated by the acquired balance information, the information notifying the user that the total price exceeds the balance.

Further features of the disclosure will become apparent from the following description of exemplary embodiments with reference to the attached drawings.

BRIEF DESCRIPTION OF THE DRAWINGS

FIG. 5 is a table illustrating an example of a structure of data representing associations between persons and products that are managed by the image processing apparatus according to the first exemplary embodiment.

FIG. 6 is a table illustrating an example of a structure of data representing information about products in the store that are managed by the image processing apparatus according to the first exemplary embodiment.

DESCRIPTION OF THE EMBODIMENTS

Figure 1:
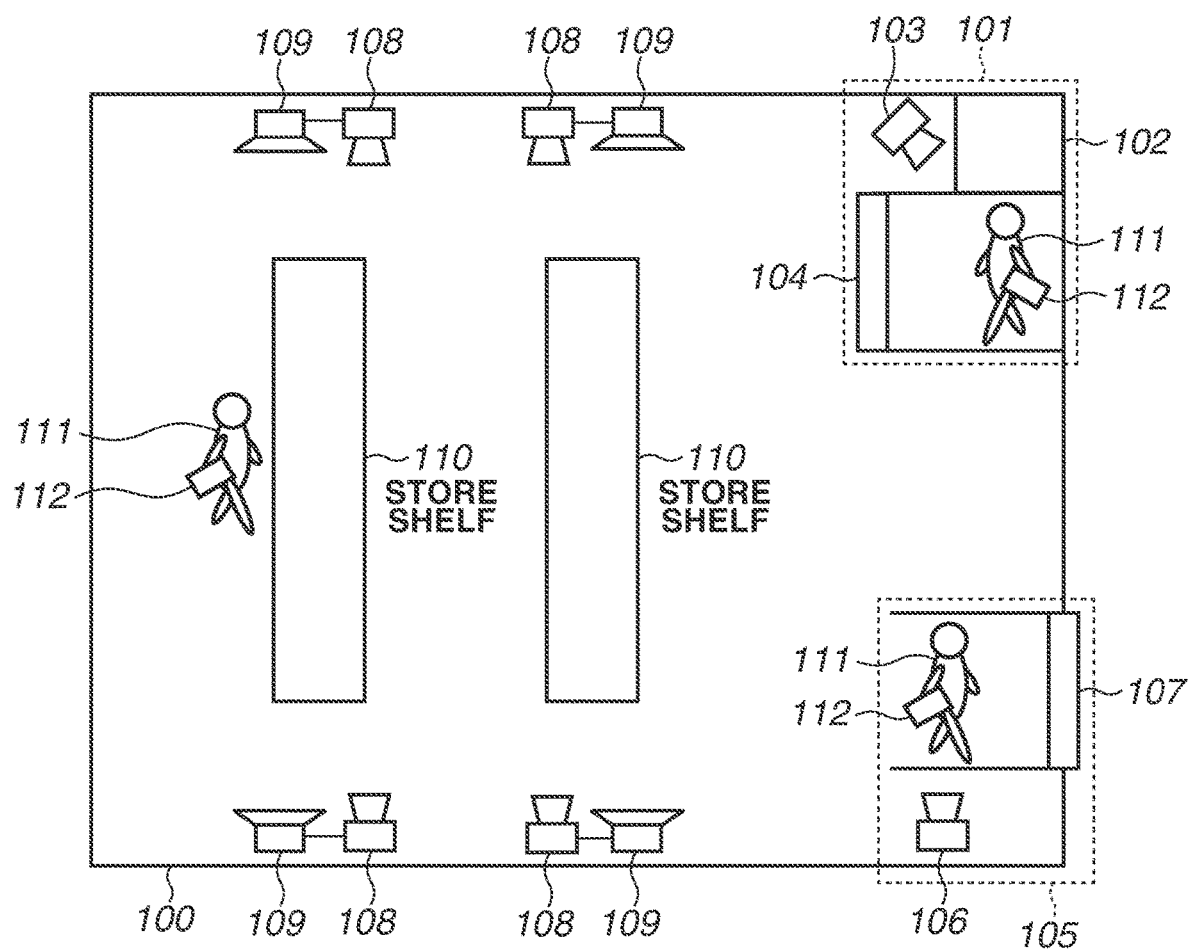
FIG. 1 is a schematic diagram illustrating an example of a store according to a first exemplary embodiment.

Exemplary embodiments of the disclosure will now be described in detail in accordance with the accompanying drawings. The exemplary embodiments described below are mere examples and are not intended to limit the scope of the disclosure. In the drawings, the same or similar components are given the same reference numerals, and redundant descriptions thereof will be omitted.

FIG. 1 is a schematic diagram illustrating an example of a store 100 according to a first exemplary embodiment. The store 100 is provided with a store entrance 101, a store exit 105, store cameras 108, voice notification apparatuses 109, and store shelves 110. There are customers 111 in the store 100.

Each of the customers 111 carries a terminal apparatus (storage apparatus) 112 such as a smartphone. The terminal apparatus 112 has a display function and is connectable to a network. The terminal apparatus 112 may be an integrated circuit (IC) card. In this case, a money information reading apparatus 102, an entrance area camera 103, and an entrance gate 104 are provided at the store entrance 101. In addition, an exit area camera 106 and an exit gate 107 are provided at the store exit 105. There may be a plurality of the store entrances 101 and a plurality of the store exits 105 in the store 100.

At the store entrance 101, as processing for entry of each of the customers (users) 111 into the store 100, the money information reading apparatus 102 reads, from the terminal apparatus 112 of the customer 111, money information (the maximum amount of electronic money that the customer 111 can use at the time of entry into the store 100) and terminal information of the terminal apparatus 112. Then, the entrance area camera 103 captures an image of the customer 111 for which the money information has been read by the money information reading apparatus 102, so that the entrance gate 104 is opened.

In the store 100, video data of the store cameras 108 is analyzed to recognize a product held by the customer 111.

At the store exit 105, video data of the exit area camera 106 is analyzed, and when the customer 111 is detected from the video data, payment processing is performed as processing for exit of the customer 111 from the store 100, based on the money information of the customer 111 and the product held by the customer 111, so that the exit gate 107 is opened.

Figure 2:
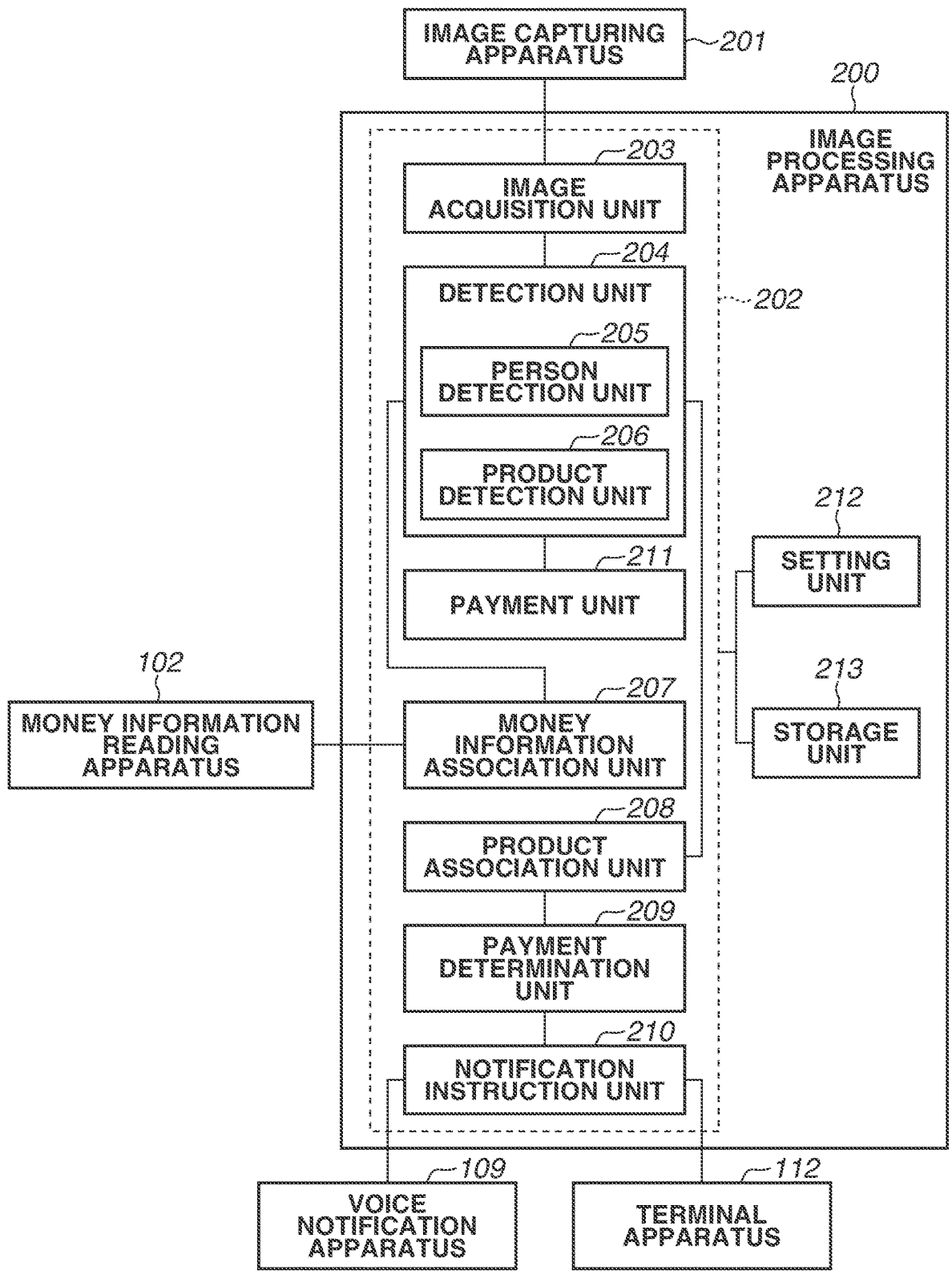
FIG. 2 is a block diagram illustrating examples of functions and configurations of an image processing apparatus according to the first exemplary embodiment and apparatuses connected to the image processing apparatus.

FIG. 2 is a block diagram illustrating examples of functions and configurations of an image processing apparatus (information processing apparatus) 200 according to the present exemplary embodiment and each apparatus connected to the image processing apparatus 200. Each block illustrated in FIG. 2 can be implemented by hardware such as a central processing unit (CPU) of a computer, other elements, or mechanical devices, or by software such as a computer program. In FIG. 2, functional blocks that are implemented by cooperation between such hardware and software components are illustrated. Thus, the persons skilled in the art having read the present specification should be able to understand that the functional blocks can be implemented by various combinations of hardware and software components.

The image processing apparatus 200 is connected to an image capturing apparatus 201 (corresponding to each of the various types of cameras illustrated in FIG. 1), the money information reading apparatus 102, each of the voice notification apparatuses 109, and each of the terminal apparatuses 112 via a network (not illustrated in FIG. 1) such as the Internet. The image processing apparatus 200 includes an operation unit 202, a setting unit 212, and a storage unit 213. The operation unit 202 performs various operations. The setting unit 212 performs settings for the operations of the operation unit 202. The storage unit 213 stores data. The operation unit 202 includes an image acquisition unit 203, a detection unit 204, a money information association unit 207, a product association unit 208, a payment determination unit 209, a notification instruction unit 210, and a payment unit 211.

The image acquisition unit 203 acquires an image from the image capturing apparatus 201 and stores the acquired image in the storage unit 213.

The detection unit 204 includes a person detection unit 205 and a product detection unit 206. The person detection unit 205 detects a person in an image. The product detection unit 206 detects a product picked up by the person in the image. In addition, the product detection unit 206 tracks the detected product using a plurality of chronologically consecutive images, thereby determining whether the customer 111 has taken the product from the store shelf 110 or the customer 111 has returned the product to the store shelf 110.

The money information association unit 207 acquires money information from the money information reading apparatus 102, and stores the acquired money information in the storage unit 213 in association with information about the person detected by the person detection unit 205 and possessing the money information. The management of data representing the association between the person and the money information will be described below with reference to FIG. 4.

The product association unit 208 stores information about the product detected by the product detection unit 206 in the storage unit 213 in association with the information about the person having picked up the product. The management of data representing the association between the person and the product will be described below with reference to FIG. 5.

In a case where there is a change in the information about the product associated with the person by the product association unit 208, the payment determination unit 209 determines whether the total price of the product is payable, based on the money information associated with the person by the money information association unit 207.

In a case where the payment determination unit 209 determines that the total price is not payable, the notification instruction unit (output unit) 210 instructs each of the voice notification apparatus 109 nearest to the customer 111 and the terminal apparatus 112 of the customer 111 to provide a predetermined notification. At this time, the notification instruction unit 210 instructs the voice notification apparatus 109 to provide the notification by voice, and instructs the terminal apparatus 112 to provide the notification using a display function of the terminal apparatus 112. As another exemplary embodiment, the notification instruction unit 210 may transmit the notification instruction to one of the voice notification apparatus 109 and the terminal apparatus 112, but in a case where the terminal apparatus 112 is an IC card, the notification instruction unit 210 instructs the voice notification apparatus 109 to provide the notification by voice.

The payment unit 211 transmits a payment request to an external electronic money payment server (not illustrated) based on the money information associated with the person by the money information association unit 207 and the total price of the product.

Figure 3:
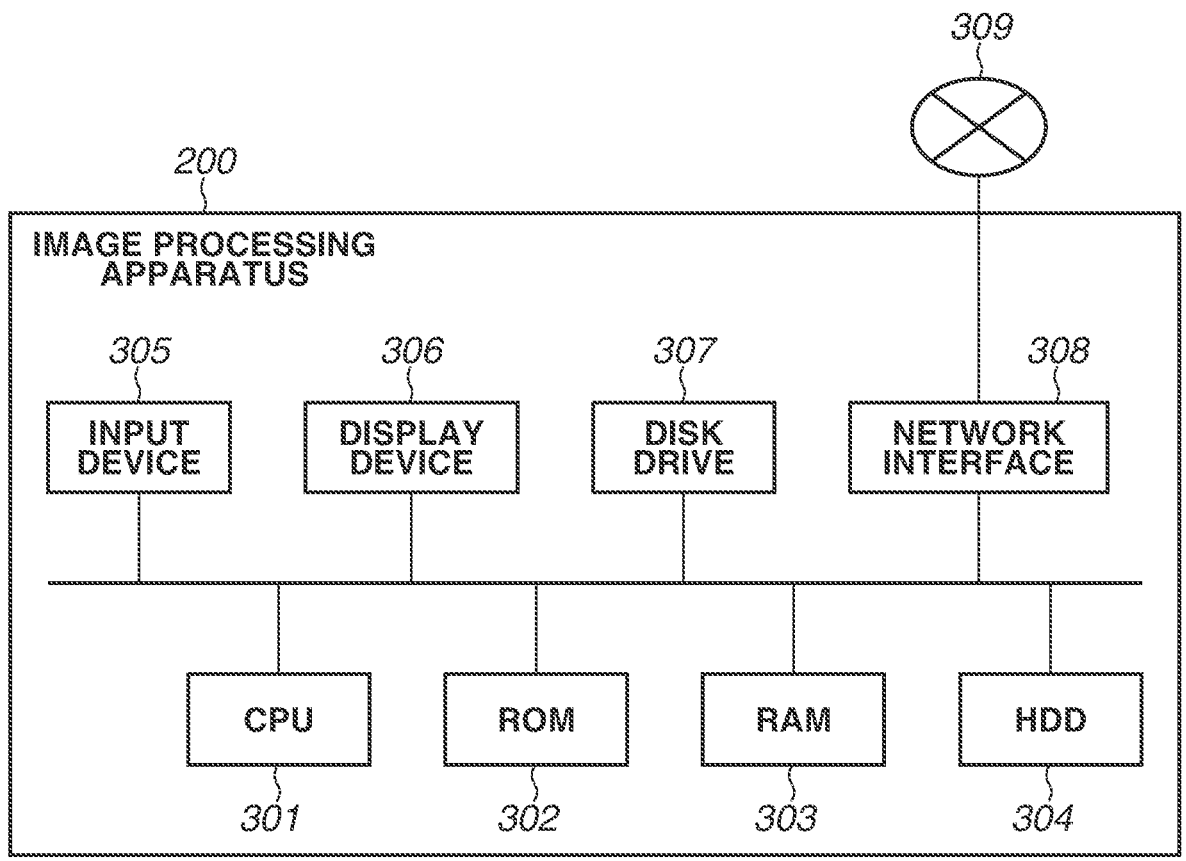
FIG. 3 is a diagram illustrating an example of a hardware configuration of the image processing apparatus according to the first exemplary embodiment.

FIG. 3 is a diagram illustrating an example of a hardware configuration of the image processing apparatus 200 according to the present exemplary embodiment. The image processing apparatus 200 includes a CPU 301, a read-only memory (ROM) 302, a random access memory (RAM) 303, a hard disk drive (HDD) 304, an input device 305, a display device 306, a disk drive 307, and a network interface 308. The network interface 308 is connected to a network 309.

The CPU 301 is a control device that comprehensively controls the image processing apparatus 200.

The ROM 302 stores a program for the CPU 301 to control the image processing apparatus 200. Alternatively, a secondary storage device may be provided in place of the ROM 302.

The RAM 303 is a memory into which the CPU 301 loads a program read from the ROM 302 to perform processing.

The RAM 303 is also used as a temporary storage area for temporarily storing data to be subjected to various types of processing.

The HDD 304 stores image data and processing target data. The CPU 301 reads the image data and the processing target data from the HDD 304.

The input device 305 includes a keyboard for inputting data such as numerical values, a pointing device for specifying a display position on a display region of the display device 306, a mouse, and a touch panel.

The display device 306 is, for example, a display that displays images and region frames.

The disk drive 307 reads image data in a compact disk (CD), a digital versatile disk (DVD), a Blu-ray disk, or a flexible disk, and the CPU 301 acquires the image data via the disk drive 307. In a case where the CPU 301 inputs image data from the HDD 304 or the network interface 308, the disk drive 307 can be eliminated.

The network interface 308 is a circuit that performs communication via the network 309. The CPU 301 acquires image data from an external apparatus (e.g., the image capturing apparatus 201) via the network 309. The CPU 301 transmits instructions to the voice notification apparatus 109 and the terminal apparatus 112, which are external apparatuses, via the network 309.

As described above, the image processing apparatus 200 has a hardware configuration including hardware components similar to those installed in a commonly-used personal computer (PC). Thus, each function performed by the image processing apparatus 200 can be implemented as software that operates on a PC. Various functions of the image processing apparatus 200 can be performed by the CPU 301 of the image processing apparatus 200 executing a program.

Figure 4:
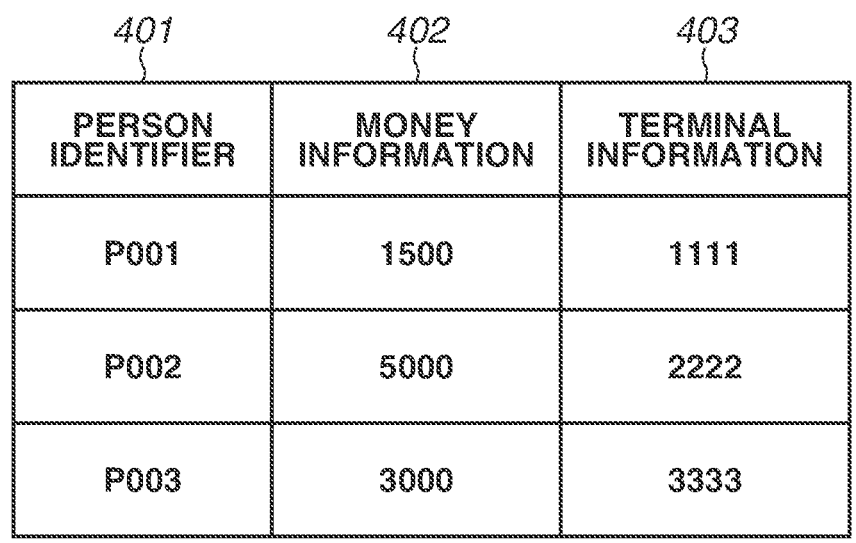
FIG. 4 is a table illustrating an example of a structure of data representing associations between persons and money information that are managed by the image processing apparatus according to the first exemplary embodiment.

FIG. 4 illustrates an example of a structure of data representing associations between persons and money information that are managed by the image processing apparatus 200 according to the present exemplary embodiment.

A person identifier 401 is used to identify the customer 111. The person identifier 401 is issued when the person detection unit 205 detects the customer 111 from the image data captured by the entrance area camera 103 at the store entrance 101.

Money information 402 indicates the upper limit amount (balance information) of electronic money usable by the customer 111 identified by the person identifier 401. The money information reading apparatus 102 at the store entrance 101 reads the money information 402 from the terminal apparatus 112 of the customer 111, and the money information association unit 207 acquires the money information 402 from the money information reading apparatus 102.

Terminal information 403 is used to identify the terminal apparatus 112 of the customer 111 identified by the person identifier 401. The money information reading apparatus 102 at the store entrance 101 reads the terminal information 403 from the terminal apparatus 112 of the customer 111, and the money information association unit 207 acquires the terminal information 403 from the money information reading apparatus 102. Although not illustrated in FIG. 4, information for providing notification of an insufficient balance of electronic money to the terminal apparatus 112 is also managed by the image processing apparatus 200. The information for providing the notification to the terminal apparatus 112 is, for example, an email address of an electronic mail viewable on the terminal apparatus 112. In a case where an application dedicated to the store 100 is installed in the terminal apparatus 112, the information is used to provide the notification to the application.

FIG. 5 illustrates an example of a structure of data representing associations between persons and products that are managed by the image processing apparatus 200 according to the present exemplary embodiment.

A person identifier 501 is used to identify the customer 111 and is similar to the person identifier 401.

A product 502 is the product picked up by the customer 111 and detected by the product detection unit 206.

A price 503 is the price of the product 502. The management of information about products in the store 100 including the price 503 will be described below with reference to FIG. 6.

A quantity 504 is the number of pieces of the product 502 picked up by the customer 111. The quantity 504 is detected by the product detection unit 206.

A total (or a total price) 505 is the total price of the product(s) 502 picked up by the customer 111.

FIG. 6 illustrates an example of a structure of data representing information about each product in the store 100 that is managed by the image processing apparatus 200 according to the present exemplary embodiment.

A product category 601 indicates a type of product. A product 602 is used to identify each product in the same product category 601 and is similar to the product 502. A price 603 is the price of the product 602 and is similar to the price 503.

Figure 7:
FIG. 7 is a diagram illustrating an example of an insufficient balance notification that is provided by a display function of a terminal apparatus based on a notification instruction from the image processing apparatus according to the first exemplary embodiment.

FIG. 7 illustrates an example of the insufficient balance notification that is provided by the display function of the terminal apparatus 112 based on the notification instruction from the image processing apparatus 200 according to the present exemplary embodiment.

The terminal apparatus 112 includes a display unit 701. A message 702 is displayed on the display unit 701 to notify the customer 111 of the insufficient balance. In a case where the image processing apparatus 200 transmits the notification instruction to the terminal apparatus 112 using an electronic mail, the message 702 is displayed by the customer 111 opening the electronic mail. In a case where the image processing apparatus 200 transmits the notification instruction to the terminal apparatus 112 using a dedicated application, the message 702 is displayed by push notification from the dedicated application.

As another exemplary embodiment, in a case where the image processing apparatus 200 transmits the notification instruction to the terminal apparatus 112 using a dedicated application, the dedicated application can operate a vibration function of the terminal apparatus 112 to provide the notification.

Figure 8:
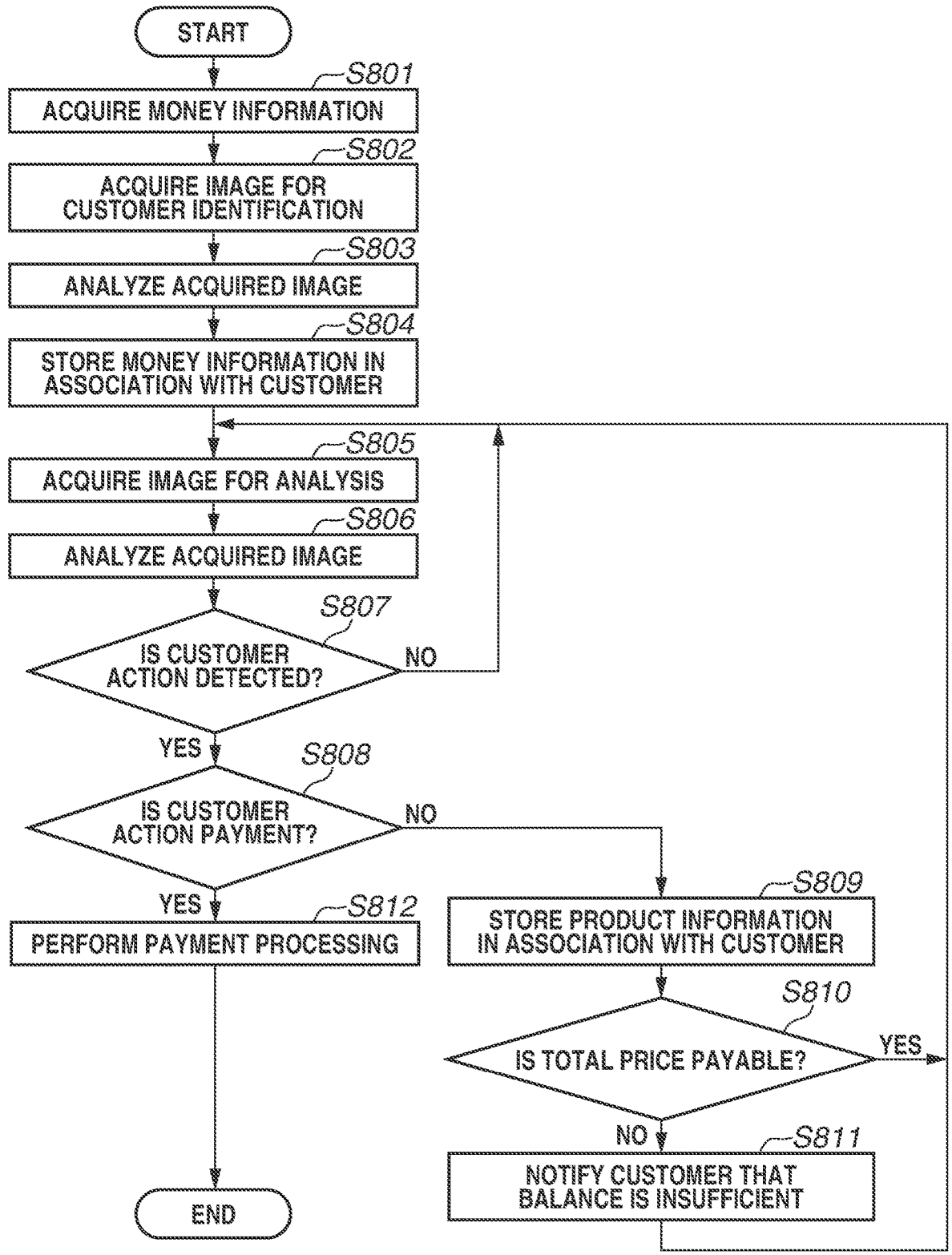
FIG. 8 is a flowchart illustrating an example of processing that is performed by the image processing apparatus according to the first exemplary embodiment during a period from when a customer enters the store to when the customer leaves the store.

FIG. 8 is a flowchart illustrating an example of processing that is performed by the image processing apparatus 200 according to the present exemplary embodiment during a period from when the customer 111 enters the store 100 to when the customer 111 exits the store 100. The processing illustrated in FIG. 8 is performed by the functional units of the image processing apparatus 200.

In step S801, the image processing apparatus 200 acquires the money information 402 and the terminal information 403 of the customer 111 from the money information reading apparatus 102.

In step S802, the image processing apparatus 200 acquires, from the entrance area camera 103, captured image data of the customer 111 for which the money information 402 has been acquired in step S801.

In step S803, the image processing apparatus 200 analyzes the image data acquired in step S802 and detects the customer 111. Then, the image processing apparatus 200 issues the person identifier 401 for identifying the customer 111.

In step S804, the image processing apparatus 200 stores the person identifier 401 issued in step S803 in association with the money information 402 and the terminal information 403 that are acquired in step S801.

In step S805, the image processing apparatus 200 acquires, from the store cameras 108, captured image data of the inside area of the store 100 for analysis in step S806. The image processing apparatus 200 also acquires, from the exit area camera 106, captured image data of the area at and around the store exit 105.

In step S806, the image processing apparatus 200 analyzes the image data acquired in step S805.

In step S807, in a case where the image processing apparatus 200 detects the product 502 picked up by the customer 111 or detects the customer 111 at the store exit 105 as a result of the analysis in step S806 (YES in step S807), the processing proceeds to step S808. On the other hand, in a case where the image processing apparatus 200 detects neither the product 502 nor the customer 111 (NO in step S807), the processing returns to step S805.

In step S808, in a case where the image processing apparatus 200 detects the product 502 picked up by the customer 111 as a result of the analysis in step S806, the image processing apparatus 200 determines that the customer 111 performs an action of either taking the product 502 from the store shelf 110 or returning the product 502 to the store shelf 110 (NO in step S808) and the processing proceeds to step S809. On the other hand, in a case where the customer 111 is detected at the store exit 105 in step S806, the image processing apparatus 200 determines that the action of the customer 111 is payment (YES in step S808), and the processing proceeds to step S812.

In step S809, the image processing apparatus 200 stores the person identifier 401 issued in step S803 and information about the product 502 detected in step S806 in association with each other. In a case where the image processing apparatus 200 determines that the customer 111 has performed the action of returning the product 502 to the store shelf 110 as a result of the analysis in step S806, in step S809, the image processing apparatus 200 cancels the association of the returned product 502 with the customer 111.

In step S810, the image processing apparatus 200 determines whether the total price 505 is payable, based on the money information 402 of the customer 111. In a case where the total price 505 is payable (YES in step S810), the processing returns to step S805. Otherwise (NO in step S810), the processing proceeds to step S811.

In step S811, the image processing apparatus 200 transmits an instruction to notify the customer 111 of the insufficient balance, to the voice notification apparatus 109 nearest to the customer 111 and the terminal apparatus 112. At this time, the image processing apparatus 200 instructs the voice notification apparatus 109 to provide the notification by voice, and instructs the terminal apparatus 112 to provide the notification using the display function of the terminal apparatus 112. After the transmission of the instruction, the processing returns to step S805.

In step S812, the image processing apparatus 200 transmits a payment request to the external electronic money payment server (not illustrated) based on the money information 402 of the customer 111 and the total price 505, and the processing ends.

As described above, according to the present exemplary embodiment, the customer 111 is notified of an insufficient balance of electronic money before paying with electronic money, so that the customer 111 can take action such as charging electronic money or returning a product. In other words, an insufficient balance of electronic money at the time of payment with electronic money can be prevented.

In a second exemplary embodiment, a method for notifying the customer 111 that no products in the store 100 can be purchased with the current electronic money balance, in addition to the above-described processing according to the first exemplary embodiment, in a case where no products in the store 100 can be purchased with the current electronic money balance will be described. Redundant descriptions of portions similar to those according to the first exemplary embodiment will be omitted, and only characteristic features according to the second exemplary embodiment will be described.

Figure 9:
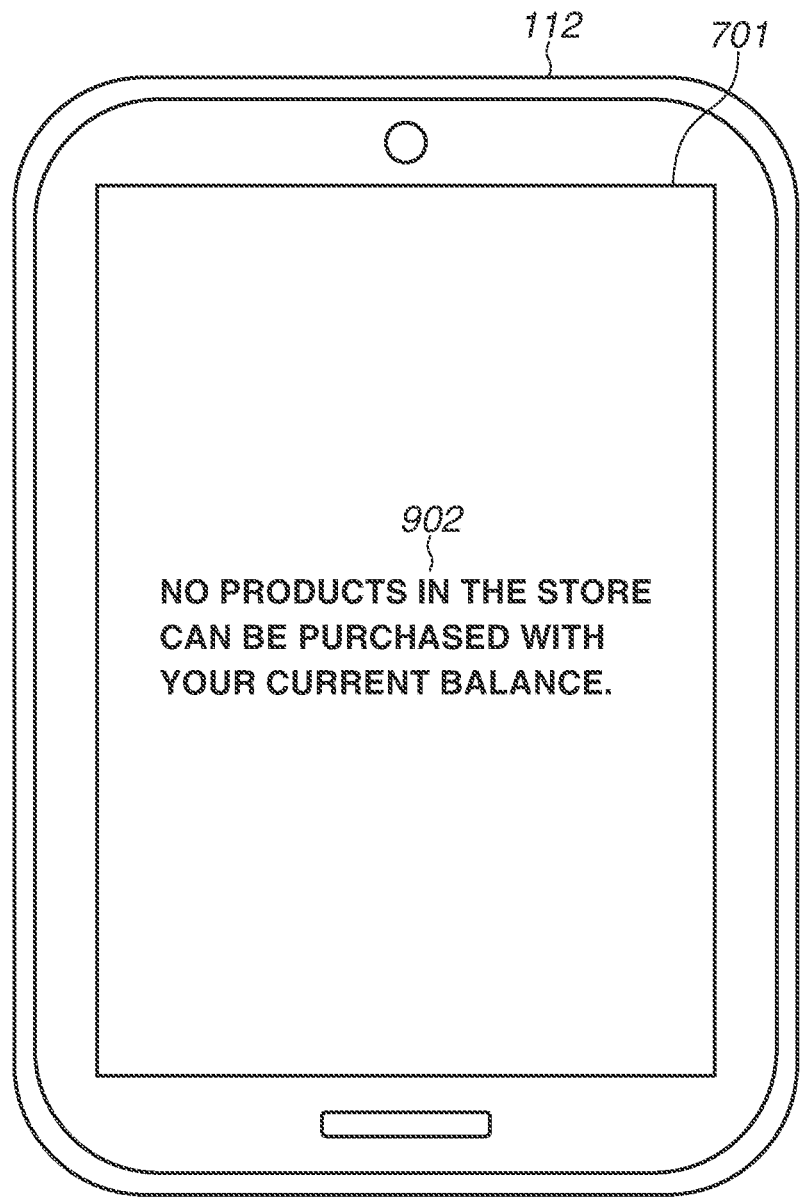
FIG. 9 is a diagram illustrating an example of a notification that no products in the store can be purchased with the current balance, which is provided by the display function of the terminal apparatus based on a notification instruction from an image processing apparatus according to a second exemplary embodiment.

FIG. 9 illustrates an example of a notification that no products in the store 100 can be purchased with the current electronic money balance, which is provided by the display function of the terminal apparatus 112 based on a notification instruction from the image processing apparatus 200 according to the present exemplary embodiment.

A message 902 notifies the customer 111 that no products in the store 100 can be purchased with the current balance. In a case where the image processing apparatus 200 transmits the notification instruction to the terminal apparatus 112 using an electronic mail, the message 902 is displayed by the customer 111 opening the electronic mail. In a case where the image processing apparatus 200 transmits the notification instruction to the terminal apparatus 112 using a dedicated application, the message 902 is displayed by push notification from the dedicated application.

Figure 10:
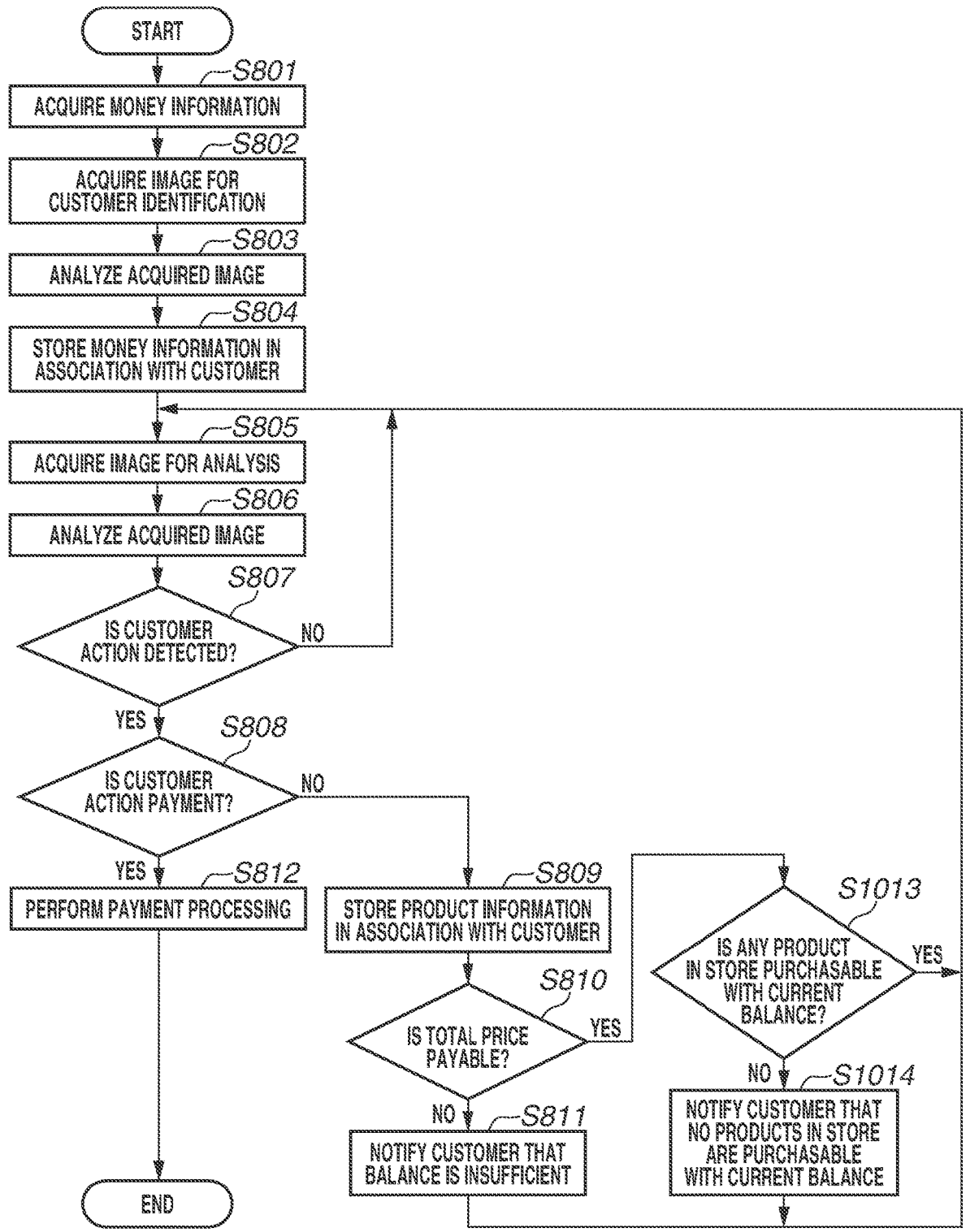
FIG. 10 is a flowchart illustrating an example of processing that is performed by the image processing apparatus according to the second exemplary embodiment during a period from when a customer enters the store to when the customer leaves the store.

FIG. 10 is a flowchart illustrating an example of processing that is performed by the image processing apparatus 200 according to the present exemplary embodiment during a period from when the customer 111 enters the store 100 to when the customer 111 exits the store 100. In FIG. 10, steps S1013 and S1014 are added to the processing illustrated in FIG. 8.

In step S1013, the image processing apparatus 200 determines whether there is a product in the store 100 that can be purchased with the current electronic money balance, based on the money information 402 of the customer 111 and the total price 505. To make this determination, data on the prices of the cheapest products in the store 100 is stored in advance in the image processing apparatus 200. In a case where there is a product in the store 100 that can be purchased with the current balance (YES in step S1013), the processing returns to step S805. Otherwise (NO in step S1013), the processing proceeds to step S1014.

In step S1014, the image processing apparatus 200 transmits an instruction to notify the customer 111 that no products in the store 100 can be purchased with the current balance, to the voice notification apparatus 109 nearest to the customer 111 and the terminal apparatus 112. At this time, the image processing apparatus 200 instructs the voice notification apparatus 109 to provide the notification by voice, and instructs the terminal apparatus 112 to provide the notification using the display function of the terminal apparatus 112. After the transmission of the instruction, the processing returns to step S805.

As described above, according to the present exemplary embodiment, during the period after picking up a product and before picking up another product, the customer 111 is notified that no more products can be purchased with the current electronic money balance.

In the first exemplary embodiment, in a case where the total price 505 is not payable, the customer 111 is notified of the insufficient balance. In a third exemplary embodiment, a method for notifying the customer 111 of a combination of products that maximizes the total price 505 within the current balance, in addition to providing the insufficient balance notification will be described below. Redundant descriptions of portions similar to those according to the first exemplary embodiment will be omitted, and only characteristic features according to the third exemplary embodiment will be described.

Figure 11:
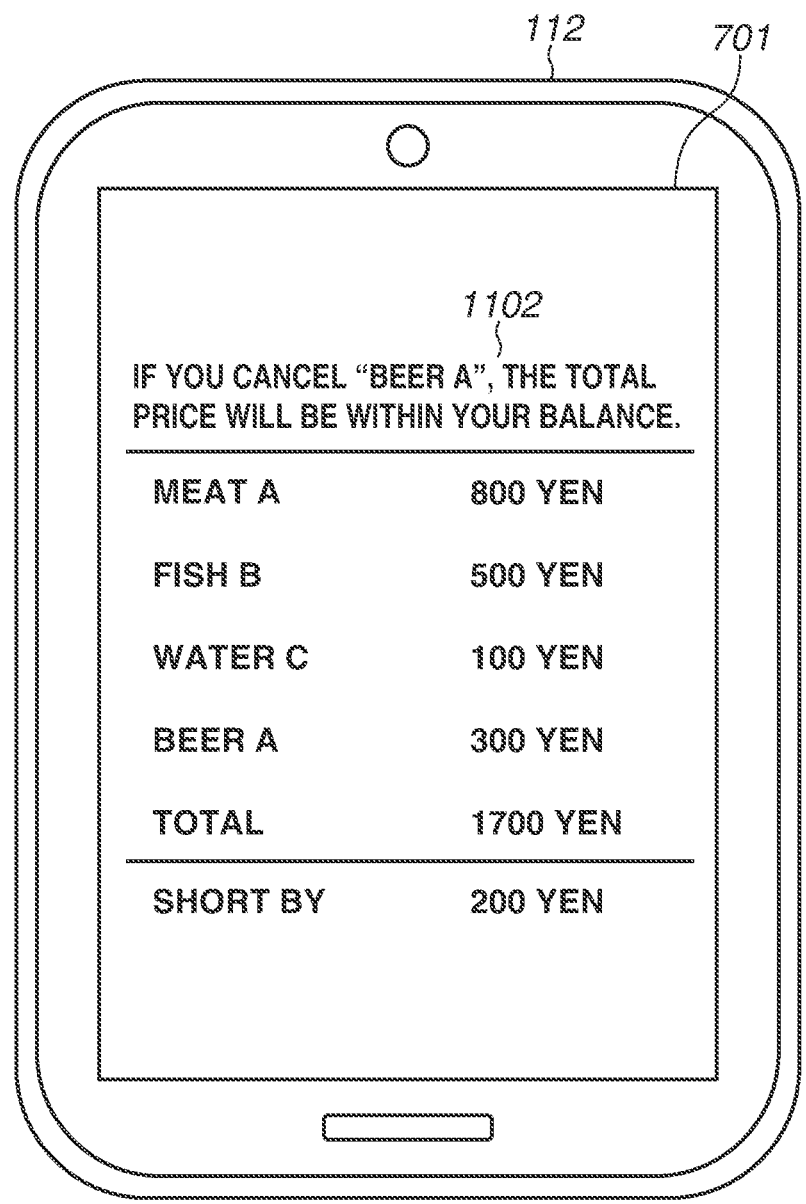
FIG. 11 is a diagram illustrating an example of an insufficient balance notification that is provided by the display function of the terminal apparatus based on a notification instruction from an image processing apparatus according to a third exemplary embodiment.

FIG. 11 illustrates an example of an insufficient balance notification provided by the display function of the terminal apparatus 112 based on a notification instruction from the image processing apparatus 200 according to the present exemplary embodiment.

A message 1102 notifies the customer 111 of the insufficient balance, and also notifies the customer 111 of a combination of products that maximizes the total price 505 within the current balance (i.e., in the range less than or equal to the current balance). In a case where the image processing apparatus 200 transmits the notification instruction to the terminal apparatus 112 using an electronic mail, the message 1102 is displayed by the customer 111 opening the electronic mail. In a case where the image processing apparatus 200 transmits the notification instruction to the terminal apparatus 112 using a dedicated application, the message 1102 is displayed by push notification from the dedicated application.

Figure 12:
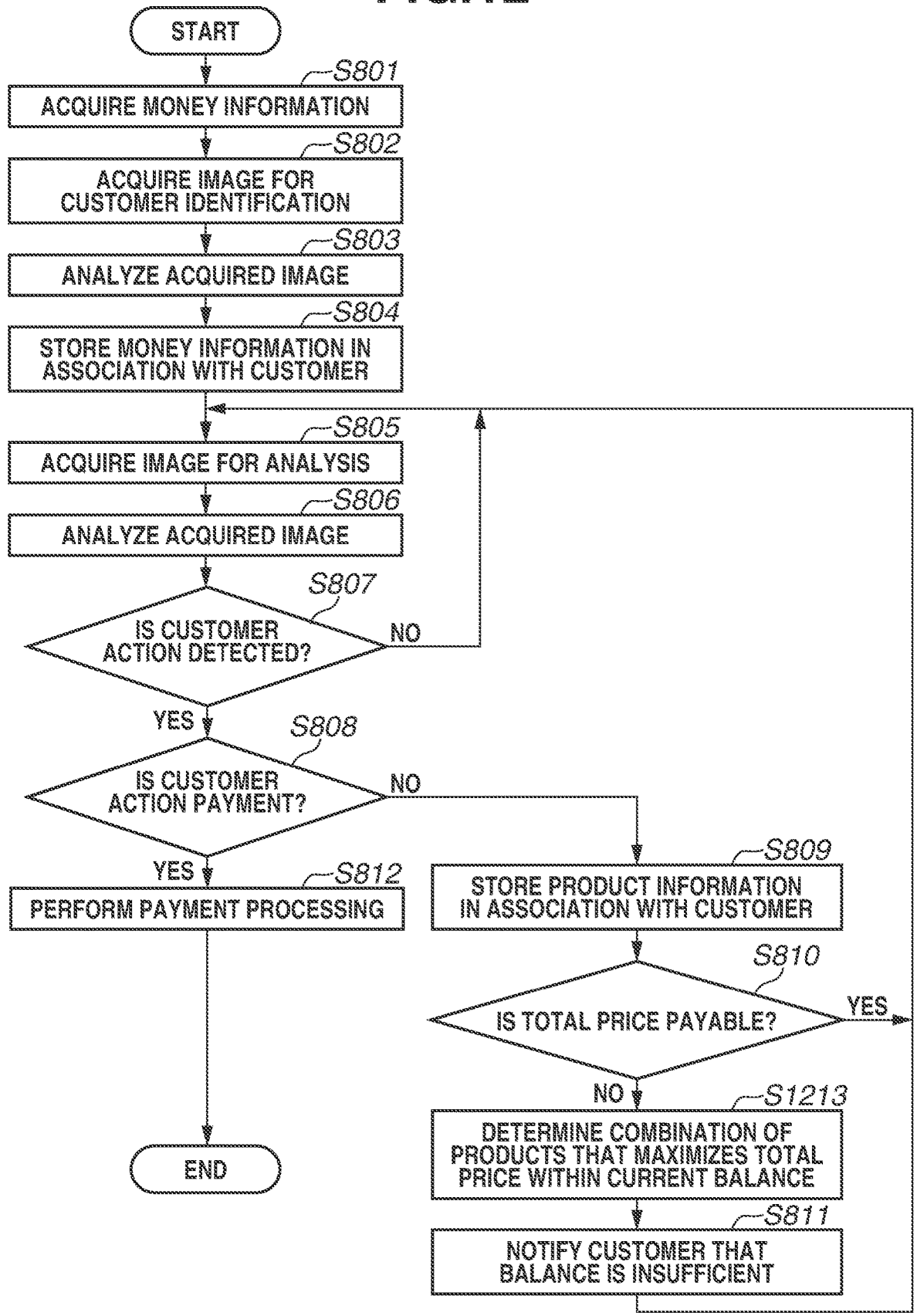
FIG. 12 is a flowchart illustrating an example of processing that is performed by the image processing apparatus according to the third exemplary embodiment during a period from when a customer enters a store to when the customer leaves the store.

FIG. 12 is a flowchart illustrating an example of processing that is performed by the image processing apparatus 200 according to the present exemplary embodiment during a period from when the customer 111 enters the store 100 to when the customer 111 exits the store 100. In FIG. 12, step S1213 is added to the processing illustrated in FIG. 8.

In step S1213, the image processing apparatus 200 determines a combination of products that maximizes the total price 505 within the current balance, based on the money information 402 of the customer 111 and the price 503. The determined combination is used for the notification instruction in step S811.

As described above, according to the present exemplary embodiment, the customer 111 is notified of a combination of products that can be purchased using the current electronic money balance to the maximum extent possible.

In the first exemplary embodiment, in a case where the total price 505 is not payable, the customer 111 is notified of the insufficient balance. In a fourth exemplary embodiment, a method for notifying the customer 111 of a combination of products including a less expensive alternative product in a case where the alternative product is in the store 100, in addition to providing the insufficient balance notification will be described below. Redundant descriptions of portions similar to those according to the first exemplary embodiment will be omitted, and only characteristic features according to the fourth exemplary embodiment will be described.

Figure 13:
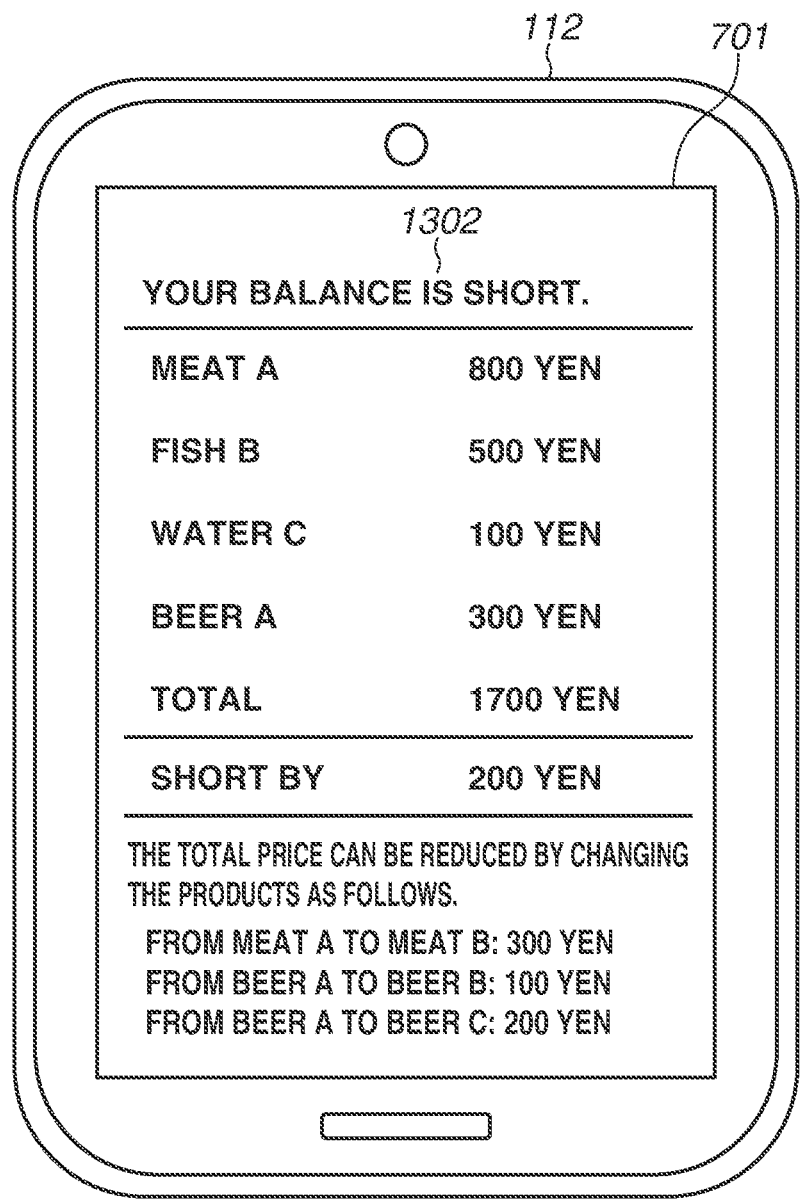
FIG. 13 is a table illustrating an example of an insufficient balance notification that is provided by the display function of the terminal apparatus based on a notification instruction from an image processing apparatus according to a fourth exemplary embodiment.

FIG. 13 illustrates an example of an insufficient balance notification that is provided by the display function of the terminal apparatus 112 based on a notification instruction from the image processing apparatus 200 according to the present exemplary embodiment.

A message 1302 notifies the customer 111 of the insufficient balance, and also notifies the customer 111 of a combination of products including a less expensive alternative product (a less expensive similar product) in a case where the alternative product is in the store 100. In a case where the image processing apparatus 200 transmits the notification instruction to the terminal apparatus 112 using an electronic mail, the message 1302 is displayed by the customer 111 opening the electronic mail. In a case where the image processing apparatus 200 transmits the notification instruction to the terminal apparatus 112 using a dedicated application, the message 1302 is displayed by push notification from the dedicated application.

Figure 14:
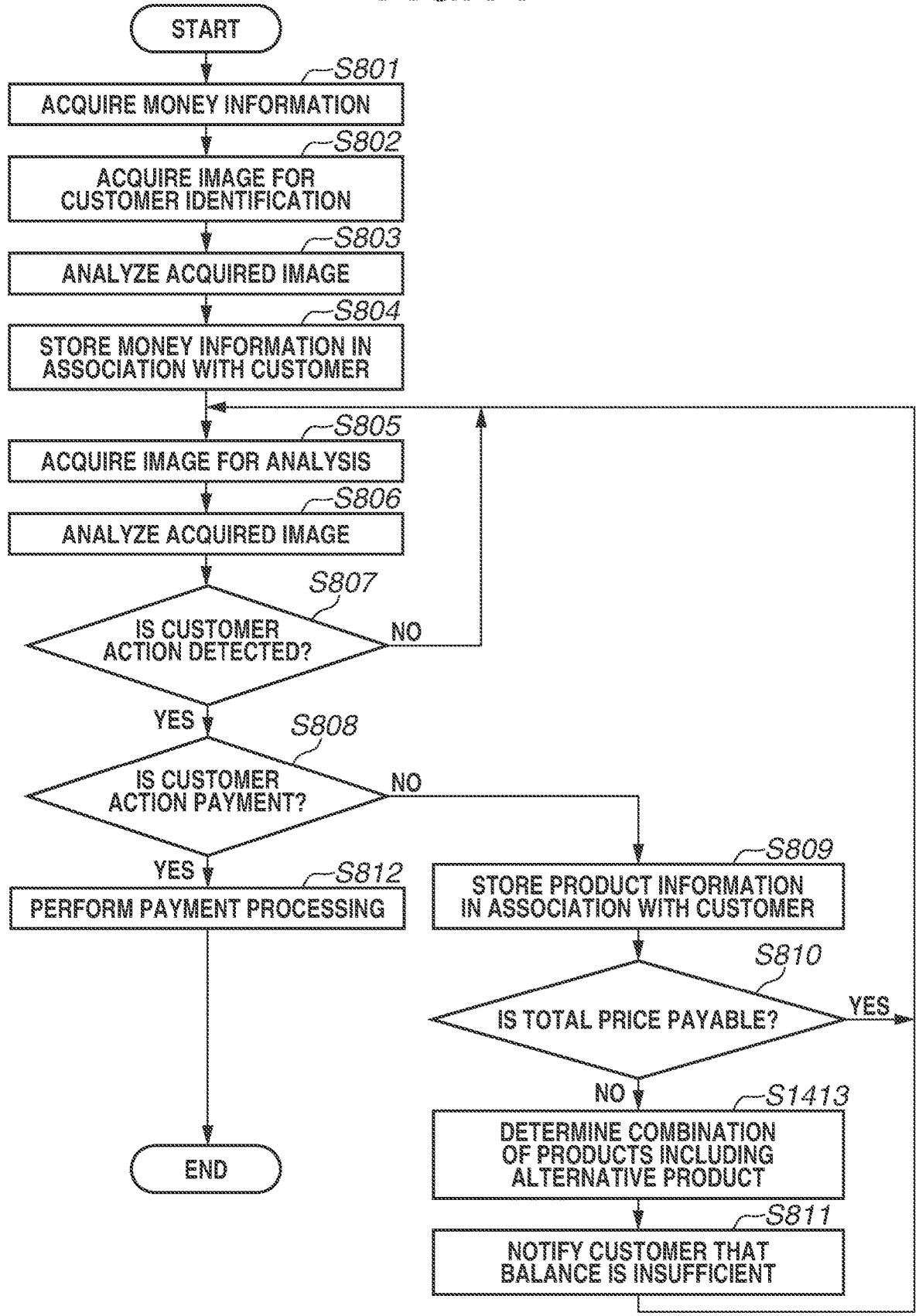
FIG. 14 is a flowchart illustrating an example of processing that is performed by the image processing apparatus according to the fourth exemplary embodiment during a period from when a customer enters a store to when the customer leaves the store.

FIG. 14 is a flowchart illustrating an example of processing that is performed by the image processing apparatus 200 according to the present exemplary embodiment during a period from when the customer 111 enters the store 100 to when the customer 111 exits the store 100. In FIG. 14, step S1413 is added to the processing illustrated in FIG. 8.

In step S1413, the image processing apparatus 200 determines whether an alternative product that is of the same product type and is less expensive is in the store 100, based on the money information 402 and the product 502 that are associated with the customer 111 and the information about the product 602 in the store 100 that is described above with reference to FIG. 6. Then, in a case where there is an alternative product, a combination of products including the alternative product is determined. The determined combination is used for the notification instruction in step S811.

As described above, according to the present exemplary embodiment, the customer 111 can do the shopping without reducing the number of products to be purchased if the balance is insufficient.

In the above-described exemplary embodiments, after the product 502 picked up by the customer 111 is detected, whether the total price 505 is payable is determined. In a fifth exemplary embodiment, before the customer 111 picks up the product 502, whether the total price 505 based on the assumption that the product 502 has been picked up is payable is determined.

More specifically, the image processing apparatus 200 detects a movement direction of the hand of the customer 111, and in a case where the distance between the hand of the customer 111 and the product 502 ahead of the hand of the customer 111 becomes a predetermined value, the product 502 is determined to have been picked up by the customer 111. Then, the image processing apparatus 200 performs step S808 and the subsequent steps in FIG. 8.

As described above, according to the present exemplary embodiment, in a case where the electronic money balance is insufficient, the customer 111 is notified of the insufficient balance before picking up the product 502. This can save the customer from having to return the product 502 to the store shelf 110.

While the exemplary embodiments of the disclosure have been described in detail above, the disclosure is not limited to the specific exemplary embodiments, and various forms within the spirit of the disclosure are encompassed in the scope of the disclosure. In addition, the above-described exemplary embodiments can partially be combined as needed.

Furthermore, processing in which a software program for implementing the functions according to the above-described exemplary embodiments is supplied to a system or an apparatus including a computer capable of executing the program directly from a recording medium or via wired or wireless communication and the program is executed is also included in the exemplary embodiments of the disclosure. Thus, program codes that are supplied to a computer and installed in the computer so that functional processing according to an exemplary embodiment of the disclosure is implemented by the computer also implement an exemplary embodiment of the disclosure. In other words, a computer program for implementing functional processing according to an exemplary embodiment of the disclosure is also encompassed in the exemplary embodiments of the disclosure. In this case, the program can be in any form having a program function, such as an object code, a program to be executed by an interpreter, or script data to be supplied to an operating system (OS).

A recording medium for supplying a program can be, for example, a hard disk, a magnetic recording medium such as a magnetic tape, an optical or magnetooptical storage medium, or a non-volatile semiconductor memory. Furthermore, one possible example of a method for supplying a program is that a computer program constituting an exemplary embodiment of the disclosure is stored on a server on a computer network and a client computer connected to the server downloads and executes the computer program.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-114212, filed Jul. 1, 2020, which is hereby incorporated by reference herein in its entirety.

What is claimed is:

1. An apparatus comprising:
one or more processors; and
one or more memories containing instructions that, when executed by the one or more processors, cause the one or more processors to function as:
an acquisition unit configured to receive user information via a network from a storage apparatus possessed by a user;
a first detection unit configured to detect, from a captured image, the user for which the user information is acquired by the acquisition unit at an entrance and control an entrance gate to allow the user to enter;
a second detection unit configured to detect the user at an exit and control an exit gate based on the user information to allow the user to exit;
a generation unit configured to generate a person identifier of the user detected from the captured image at the entrance;
an association unit configured to associate (i) a storage identifier of the storage apparatus from which the acquisition unit receives the user information, (ii) the user information acquired by the acquisition unit and (iii) the person identifier of the user generated by the generation unit;
a recognition unit configured to recognize one or more products held by the user based on an image transmitted via the network by an image capturing unit in a store and configured to associate product information of the recognized one or more products with the person identifier;
a determination unit configured to determine, based on the user information and the product information each of which are associated with the person identifier, if the product information of the recognized one or more products does not match the user information;
an identification unit configured to identify, when the product information of the recognized one or more products does not match the user information, the storage identifier of the storage apparatus to be notified based on association performed by the association unit; and
an output unit configured to notify the storage apparatus corresponding to the identified storage identifier via the network in a case where product information associated with the recognized one or more products does not match the user information,
wherein the recognition unit tracks the detected one or more products using a plurality of chronologically consecutive images to determine a product status regarding whether the detected one or more products are taken from a store shelf or returned to the store shelf in a store,
wherein the recognition unit further determines product information based on the product status,
wherein the identification unit further identifies a voice notification apparatus nearest to the user from among a plurality of the voice notification apparatuses in the store when the product information associated with the recognized one or more products does not match the user information, and
wherein the output unit is configured to notify the user using the identified voice notification apparatus in a case where product information associated with the recognized one or more products does not match the user information.

2. The apparatus according to claim 1, wherein the first detection unit detects the user based on an image acquired by an image capturing apparatus at the entrance of the store.

3. The apparatus according to claim 1, wherein the determination unit determines the product status by:
detecting a movement direction of a hand of the user;
determining a distance between the hand of the user and the detected one or more products; and
determining the product status based on the distance and the movement direction.

4. The apparatus according to claim 2, wherein the second detection unit detects the user based on an image acquired by an image capturing apparatus at the exit of the store.

5. The apparatus according to claim 4, wherein the determination unit determines a user's action based on the product status and the detected user at the exit.

6. The apparatus according to claim 1, wherein the one or more processors further function as a voice notification unit configured to provide a notification by voice or via the storage apparatus.

7. The apparatus according to claim 6, wherein in a case where the storage apparatus is an integrated circuit (IC) card having a wireless communication function, the output unit outputs the information via the voice notification unit.

8. A method comprising:
receiving user information via a network, from a storage apparatus possessed by a user;
detecting, from a captured image, the user for which the user information is received at an entrance and controlling an entrance gate to allow the user to enter;
detecting the user at an exit and controlling an exit gate based on the user information to allow the user to exit;
generating a person identifier of the user detected from the captured image at the entrance;
associating (i) a storage identifier of the storage apparatus from which the user information is received, (ii) the received user information and (iii) the generated person identifier;
recognizing one or more products held by the user based on an image transmitted via the network by an image capturing unit in a store and associating product information of the recognized one or more products with the person identifier;
determining, based on the user information and the product information each of which are associated with the person identifier, if the product information of the recognized one or more products does not match the user information;
identifying, when the product information of the recognized one or more products does not match the user information, the storage identifier of the storage apparatus to be notified based on association performed by the associating;
notifying the storage apparatus corresponding to the identified storage identifier via the network in a case where product information associated with the recognized one or more products does not match the user information;
tracking the detected one or more products using a plurality of chronologically consecutive images to determine a product status regarding whether the detected one or more products are taken from a store shelf or returned to the store shelf in a store,
wherein tracking further determines product information based on the product status,
wherein identifying further identifies a voice notification apparatus nearest to the user from among a plurality of the voice notification apparatuses in the store when the product information associated with the recognized one or more products does not match the user information, and
wherein notifying notifies the user using the identified voice notification apparatus in a case where product information associated with the recognized one or more products does not match the user information.

9. The method according to claim 8, wherein detecting the user comprises:
detecting the user based on an image acquired by an image capturing apparatus at the entrance of the store.

10. The method according to claim 8, wherein tracking the detected one or more products to determine the product status comprises:
detecting a movement direction of a hand of the user;
determining a distance between the hand of the user and the detected one or more products; and
determining the product status based on the distance and the movement direction.

11. The method according to claim 9, wherein detecting the user comprises detecting the user based on an image acquired by an image capturing apparatus at the exit of the store.

12. The method according to claim 11, further comprising:
determining a user's action based on the product status and the detected user at the exit.

13. The method according to claim 8, wherein the outputting outputs the information via a voice notification unit configured to provide a notification by voice or via the storage apparatus.

14. A non-transitory computer-readable storage medium storing a program for causing a computer to execute a method for controlling an apparatus, the method comprising:
receiving user information via a network, from a storage apparatus possessed by a user;
detecting, from a captured image, the user for which the user information is received at an entrance and controlling an entrance gate to allow the user to enter;
detecting the user at an exit and controlling an exit gate based on the user information to allow the user to exit;
generating a person identifier of the user detected from the captured image at the entrance;
associating (i) a storage identifier of the storage apparatus from which the user information is received, (ii) the received user information and (iii) the generated person identifier;
recognizing one or more products held by the user based on an image transmitted via the network by an image capturing unit in a store and associating product information of the recognized one or more products with the person identifier;
determining, based on the user information and the product information each of which are associated with the person identifier, if the product information of the recognized one or more products does not match the user information;
identifying, when the product information of the recognized one or more products does not match the user information, the storage identifier of the storage apparatus to be notified based on association performed by the associating;
notifying the storage apparatus corresponding to the identified storage identifier via the network in a case where product information associated with the recognized one or more products does not match the user information;
tracking the detected one or more products using a plurality of chronologically consecutive images to determine a product status regarding whether the detected one or more products are taken from a store shelf or returned to the store shelf in a store,
wherein tracking further determines product information based on the product status,
wherein identifying further identifies a voice notification apparatus nearest to the user from among a plurality of the voice notification apparatuses in the store when the product information associated with the recognized one or more products does not match the user information, and wherein notifying notifies the user using the identified voice notification apparatus in a case where product information associated with the recognized one or more products does not match the user information.

15. The non-transitory computer-readable storage medium according to claim 14, wherein detecting the user comprises detecting the user based on an image acquired by an image capturing apparatus at the entrance of the store.

16. The non-transitory computer-readable storage medium according to claim 14, wherein tracking the detected one or more products to determine the product status comprises:

detecting a movement direction of a hand of the user;

determining a distance between the hand of the user and the detected one or more products; and determining the product status based on the distance and the movement direction.

17. The non-transitory computer-readable storage medium according to claim 15, wherein detecting the user comprises detecting the user based on an image acquired by an image capturing apparatus at the exit of the store.

18. The non-transitory computer-readable storage medium according to claim 17, wherein the method further comprises:

determining a user's action based on the product status and the detected user at the exit.

19. The non-transitory computer-readable storage medium according to claim 14, wherein the outputting outputs the information via a voice notification unit configured to provide a notification by voice or via the storage apparatus.

* * * * *